(12) United States Patent
Lee

(10) Patent No.: US 8,886,421 B2
(45) Date of Patent: Nov. 11, 2014

(54) SYSTEM AND METHOD FOR PROTECTING DRIVE SHAFT

(75) Inventor: Joongwook Lee, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 143 days.

(21) Appl. No.: 13/192,285

(22) Filed: Jul. 27, 2011

(65) Prior Publication Data
US 2012/0143455 A1    Jun. 7, 2012

(30) Foreign Application Priority Data
Dec. 1, 2010 (KR) .......................... 10-2010-0121622

(51) Int. Cl.
| | | |
|---|---|---|
| G06F 7/00 | (2006.01) | |
| G06F 17/00 | (2006.01) | |
| G06F 19/00 | (2011.01) | |
| B60K 28/10 | (2006.01) | |
| B60W 10/06 | (2006.01) | |
| B60W 30/184 | (2012.01) | |

(52) U.S. Cl.
CPC ........ *B60K 28/10* (2013.01); *B60W 2510/1005* (2013.01); *B60W 10/06* (2013.01); *B60W 2520/10* (2013.01); *B60W 2710/0666* (2013.01); *B60W 2510/0638* (2013.01); *B60W 2540/18* (2013.01); *B60W 30/1846* (2013.01)
USPC ............................................... 701/54; 701/51

(58) Field of Classification Search
CPC .................... B60W 10/06; B60W 2710/0666; B60W 2710/105; B60K 28/10
USPC ...................................................... 701/51, 54
See application file for complete search history.

(56) References Cited

U.S. PATENT DOCUMENTS

| | | | | |
|---|---|---|---|---|
| 5,184,527 A | * | 2/1993 | Nakamura | .................... 477/110 |
| 6,076,032 A | * | 6/2000 | Kuroda et al. | ................... 701/54 |
| 2003/0010025 A1 | * | 1/2003 | Evans | .............................. 60/431 |

FOREIGN PATENT DOCUMENTS

| | | | |
|---|---|---|---|
| JP | 7-309158 | A | 11/1995 |
| JP | 2001-339813 | A | 12/2001 |
| JP | 2004-19632 | A | 1/2004 |
| JP | 2006-168650 | A | 6/2006 |
| JP | 2008-020354 | A | 1/2008 |
| JP | 2008-207723 | A | 9/2008 |
| KR | 100783319 | B1 | 12/2007 |

OTHER PUBLICATIONS

Jim-Hyeok Heo KR 10-0783319, Controlling System of Driving Torque for Reduction of Minimum Turning Radius, Dec. 10, 2007, The Korean Intellectual Property Office, Translated Feb. 27, 2013 via KIPO.*

* cited by examiner

*Primary Examiner* — Fadey Jabr
*Assistant Examiner* — Thomas Ingram
(74) *Attorney, Agent, or Firm* — Morgan, Lewis & Bockius LLP

(57) ABSTRACT

A method for protecting a drive shaft including determining whether a currently selected shift-speed may be a reverse speed, determining, in a case that the currently selected shift-speed may be the reverse speed, whether current steering angle may be full turn angle, determining, in a case that the current steering angle may be the full turn angle, whether stall condition may be satisfied, and controlling torque applied to the drive shaft to be smaller than limit torque by reducing output torque of an engine in a case that the stall condition may be satisfied may be disclosed.

2 Claims, 2 Drawing Sheets

SYSTEM AND METHOD FOR PROTECTING DRIVE SHAFT

CROSS-REFERENCE TO RELATED APPLICATION

The present application claims priority to Korean Patent Application No. 10-2010-0121622 filed in the Korean Intellectual Property Office on Dec. 1, 2010, the entire contents of which is incorporated herein for all purposes by this reference.

BACKGROUND OF THE INVENTION

1. Field of the Invention

The present invention relates to a system and a method for protecting a drive shaft. More particularly, the present invention relates to a system and a method for protecting a drive shaft which reduces output torque of an engine in a state of reverse speed and full turn and in a state that stall condition of a transmission is satisfied such that limit torque is not applied to the drive shaft.

2. Description of Related Art

Generally, if high torque of an engine is output in a state that braking force is generated, secondary moment of driving torque is generated due to the braking force and an angle of a drive shaft (an angle between the drive shaft and a level surface). Reaction force is applied to suspension components due to the secondary moment of the driving torque, and such reaction force increases steer by compliance effect and resultantly increases the angle of the drive shaft.

Particularly, in a case that a brake pedal and an accelerator pedal are simultaneously pushed so as to generate the braking force and the high engine output in a state of the full turn and the reverse speed, the limit torque is applied to the drive shaft and noise is generated. In extreme cases, chassis may be deformed and the drive shaft and a joint may be damaged. Herein, the limit torque means torque which can plastically deform the drive shaft.

For example, a common angle of the drive shaft is set to 46.5°, but the angle of the drive shaft is often larger than 46.5° due to suspension geometry. Therefore, the drive shaft may be damaged in a case of the stall of the transmission.

Size of the joint may be increased in order to maintain strength in high angle of the drive shaft, and a stopper may be installed near a knuckle or a lower arm in order not to change the suspension geometry.

However, such methods increase cost and weight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system for protecting a drive shaft having advantages of protecting the drive shaft by reducing output torque of an engine if a current driving state may damage the drive shaft.

A system for protecting a drive shaft in an aspect of the present invention may include a vehicle state detector detecting vehicle information including currently selected shift-speed, current steering angle, vehicle speed, and engine RPM, a traction control portion analyzing the vehicle information delivered from the vehicle state detector and demanding reduction of torque in a case that a predetermined condition may be satisfied, and an engine control portion reducing output torque of an engine according to torque reduction demand of the traction control portion such that torque applied to the drive shaft may be smaller than limit torque.

The predetermined condition may be satisfied when the currently selected shift-speed may be a reverse speed, the current steering angle may be full turn angle, and stall condition may be satisfied.

The stall condition may be satisfied when the vehicle speed may be slower than predetermined speed and the engine RPM may be faster than predetermined RPM.

A method for protecting a drive shaft in another aspect of the present invention may include determining whether a currently selected shift-speed may be a reverse speed, determining, in a case that the currently selected shift-speed may be the reverse speed, whether current steering angle may be full turn angle, determining, in a case that the current steering angle may be the full turn angle, whether stall condition may be satisfied, and controlling torque applied to the drive shaft to be smaller than limit torque by reducing output torque of an engine in a case that the stall condition may be satisfied.

The stall condition may be satisfied when the vehicle speed may be slower than predetermined speed and the engine RPM may be faster than predetermined RPM.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
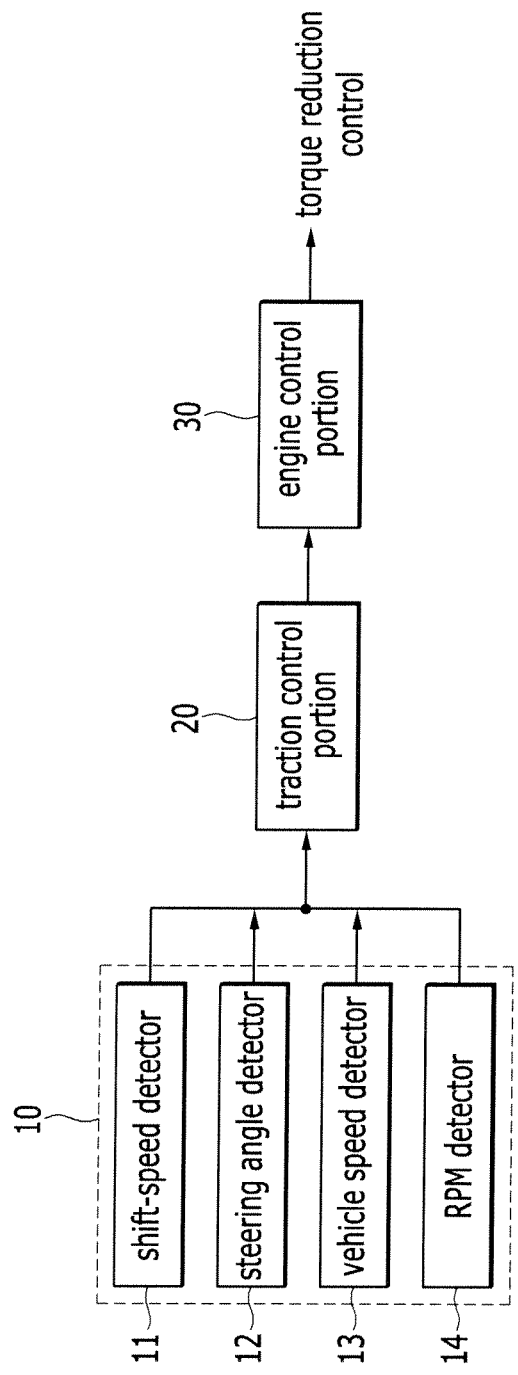
FIG. 1 is a block diagram of a system for protecting a drive shaft according to an exemplary embodiment of the present invention.
Figure 2:
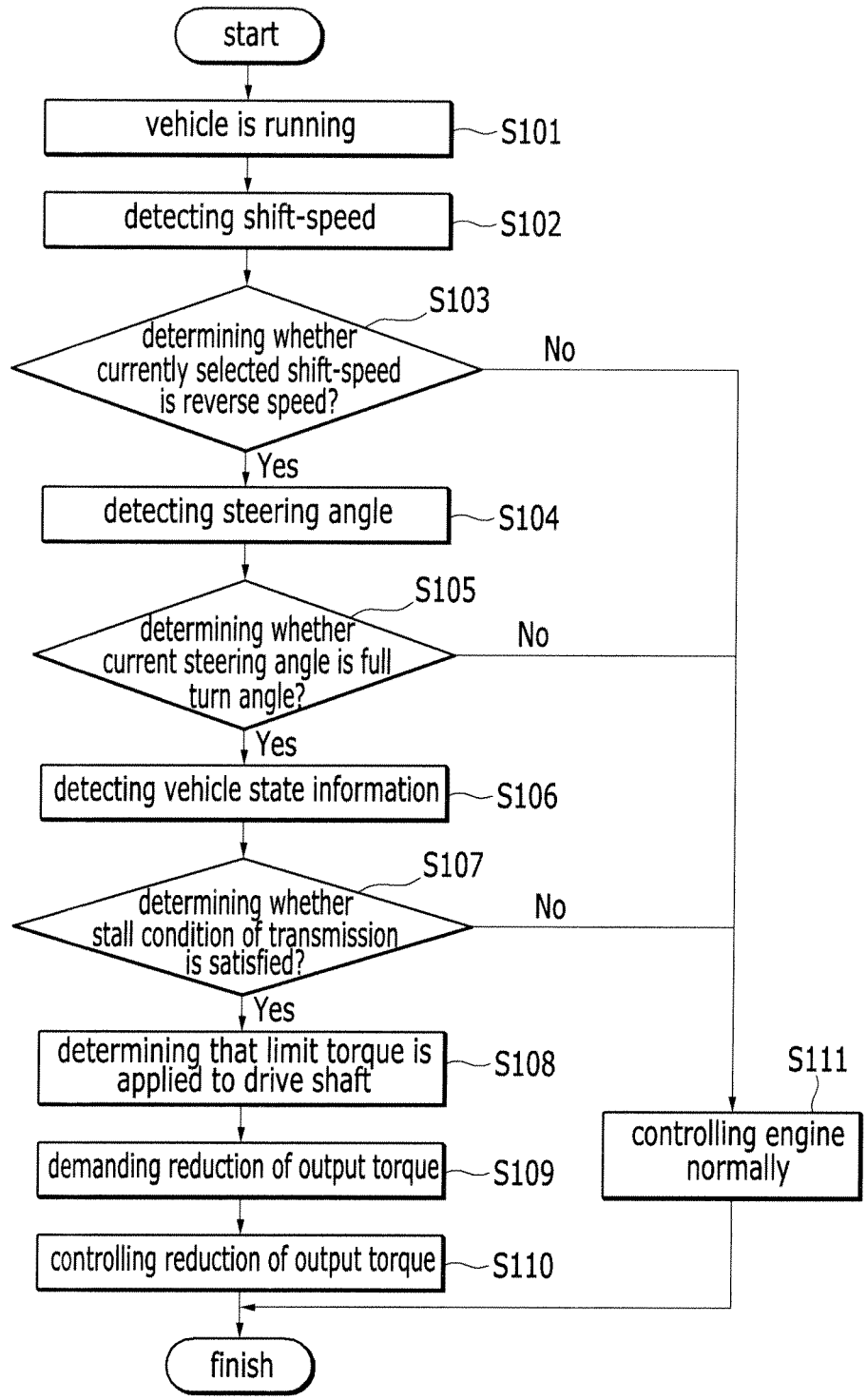
FIG. 2 is a flowchart of a method for protecting a drive shaft according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, referring to the drawings, exemplary embodiments of the present invention will be described in detail.

FIG. 1 is a block diagram of a system for protecting a drive shaft according to an exemplary embodiment of the present invention.

As shown in FIG. 1, a system for protecting a drive shaft according to an exemplary embodiment of the present invention includes a vehicle state detector 10, a traction control portion 20, and an engine control portion 30.

The vehicle state detector 10 detects shift-speed information which is a position of a shift lever, steering angle information steered by a steering wheel, vehicle speed information, an engine RPM information, and delivers the information to the traction control portion 20.

That is, the vehicle state detector 10 includes a shift-speed detector 11 detecting shift-speed which is selected by the shift lever, a steering angle detector 12 detecting steering angle steered by the steering wheel, a vehicle speed detector 13 detecting vehicle speed from rotation speed of an output shaft of a transmission or rotation speed of a wheel, and an RPM detector 14 including a crank angle sensor or a cam angle sensor and detecting rotation speed of the engine.

The traction control portion 20 analyzes the information delivered from the vehicle state detector 10 and demands torque reduction to the engine control portion 30 in a case that a predetermined condition is satisfied. The predetermined condition may be satisfied when the selected shift-speed is reverse speed, the steering angle is a full turn angle, and stall condition of a transmission is satisfied.

Therefore, the torque applied to the drive shaft is reduced through torque reduction control of the engine control portion 30 and the drive shaft is stably protected.

The stall of the transmission may be a case that the torque of the engine in input to a torque converter but rotation speed of a turbine is zero or cases corresponding thereto.

The stall condition of the transmission can be represented by a function of engine variables and transmission variables that can generate the stall.

For example, the stall condition of the transmission may be defined as a function of variables such as the engine RPM, the vehicle speed, power delivery ratio of the torque converter, RPM of the torque converter, ratios of torque of the engine and the transmission, ratio of speed of the engine and the transmission, and so on.

The stall condition of the transmission may be satisfied when the vehicle speed is slower than a predetermined speed, for example 2 km/h by operation of the brake pedal and the engine RPM is faster than a predetermined RPM, for example 2000 RPM by operation of the accelerator pedal.

The engine control portion 30 reduces the output torque of the engine by a predetermined amount according to the torque reduction demand of traction control portion 20 connected by network and prevent the limit torque from being applied to the drive shaft. Reduction of the output torque of the engine may be performed by lagging ignition timing or reducing fuel injection amount.

It is exemplarily described in this specification that the traction control portion 20 and the engine control portion 30 are separately provided, but the traction control portion 20 and the engine control portion 30 are not limited to this. That is, the traction control portion 20 and the engine control portion 30 may be combined to one control portion.

Hereinafter, a method for protecting a drive shaft according to an exemplary embodiment of the present invention will be described in detail.

In a state that the vehicle to which an exemplary embodiment of the present invention is applied is running at a step S101, the shift-speed detector 11 detects the shift-speed selected by the shift lever at a step S102. After that, the traction control portion 20 determines whether the currently selected shift-speed is the reverse speed at a step S103.

If the currently selected shift-speed is not the reverse speed at the step S103, the traction control portion 20 orders the engine control portion 30 to control the engine normally at a step S111. Accordingly, the engine control portion 30 controls the engine to output the torque according to current driving condition at the step S111.

In this specification, the normal control of the engine does not use an exemplary embodiment of the present invention and controls the engine to output the torque according to the current driving condition.

If the currently selected shift-speed is the reverse speed at the step S103, the steering angle detector 12 which is commonly installed at a steering column detects the current steering angle at a step S104, and the traction control portion 20 determines whether the current steering angle is the full turn angle of the steering wheel at a step S105.

The full turn angle of the steering wheel may be an angle larger than or equal to 37°, and may be set according to necessary performance by designers.

If the current steering angle is not the full turn angle of the steering wheel at the step S105, the traction control portion 20 orders the engine control portion 30 to control the engine normally, and the engine control portion 20 controls the engine to output the torque according to the current driving condition at the step S111.

If the current steering angle, however, is the full turn angle of the steering wheel at the step S105, and the vehicle state information including the vehicle speed, the engine RPM, the position of the accelerator pedal, and whether the brake pedal is operated is detected at a step S106.

After that, the traction control portion 20 analyzes the vehicle state information and determines whether the stall condition of the transmission is satisfied at a step S107.

The stall condition of the transmission may be satisfied when the vehicle speed is slower than a predetermined speed, for example 2 km/h by operation of the brake pedal and the engine RPM is faster than a predetermined RPM, for example 2000 RPM by operation of the accelerator pedal.

However, the vehicle speed (i.e., 2 km/h) and the engine RPM (i.e., 2000 RPM) may be set according to the necessary performance by designers.

If the stall condition of the transmission is not satisfied at the step S107, the traction control portion 20 orders the engine control portion 30 to control the engine normally, and the engine control portion 20 controls the engine to output the torque according to the current driving condition at the step S111.

If the stall condition of the transmission is satisfied at the step S107, the traction control portion 20 determines that the limit torque is applied to the drive shaft at a step S108.

Therefore, the traction control portion 20 orders the engine control portion 20 to reduce the output torque so as to prevent the limit torque from being applied to the drive shaft at a step S109.

The engine control portion 30 reduces the output torque of the engine by the predetermined amount according to the torque reduction demand and controls the torque applied to the drive shaft to be lower than the limit torque at a step S110. Thereby, the damage of the drive shaft may be prevented.

In this specification, the traction control portion has function for protecting the drive shaft, but is not limited to this. That is, a controller of a motor driven power steering (MDPS) or a controller of an electronic stability control (ESC) may have the function for protecting the drive shaft according to an exemplary embodiment of the present invention. Therefore, it is to be understood that the traction control portion includes the controller of the MDPS or the controller of the ESC in this specification and claim set.

According to an exemplary embodiment of the present invention, durability of a drive shaft may be improved by reducing output torque of an engine without changing a layout and characteristics of the vehicle. Therefore, cost may be curtailed.

In addition, since static and dynamic characteristics of the vehicle are not changed and a structure of a power train is not changed, acceleration characteristics and turbo characteristics of the vehicle may be maintained. Therefore, marketability and stability of the vehicle may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for protecting a drive shaft, comprising:
   a vehicle state detector detecting vehicle information including a currently selected shift-speed, a current steering angle, a vehicle speed, and an engine RPM;
   a traction control portion analyzing the vehicle information delivered from the vehicle state detector and demanding reduction of an output torque of an engine when a predetermined condition is satisfied, wherein the predetermined condition is satisfied when simultaneously satisfying following conditions:
   (i) the currently selected shift-speed is a reverse speed,
   (ii) the current steering angle is a full turn angle in a state of reverse speed and
   (iii) a stall condition in the state of reverse speed is satisfied, wherein the stall condition in the state of reverse speed is satisfied when the vehicle speed is slower than a predetermined speed and the engine RPM is faster than a predetermined RPM; and
   an engine control portion reducing the output torque of the engine according to the torque reduction demanded by the traction control portion such that a torque applied to the drive shaft is smaller than a limit torque, wherein the engine control portion lags ignition timing or reduces fuel injection amount for reducing the output torque of the engine.

2. A method for protecting a drive shaft, comprising:
   determining whether a currently selected shift-speed is a reverse speed by a traction control portion;
   determining, when the currently selected shift-speed is the reverse speed, whether a current steering angle is a full turn angle by the traction control portion;
   determining, when the current steering angle is the full turn angle in the reverse speed, whether a stall condition is satisfied in the reverse speed by the traction control portion, wherein the stall condition in the reverse speed is satisfied when a vehicle speed is slower than a predetermined speed and an engine RPM is faster than a predetermined RPM; and
   controlling a torque applied to the drive shaft to be smaller than a limit torque by reducing an output torque of an engine when simultaneously satisfying following conditions:
   (i) the currently selected shift-speed is the reverse speed,
   (ii) the current steering angle is the full turn angle in the reverse speed, and
   (iii) the stall condition is satisfied in the reverse speed,
   wherein the controlling the torque is conducted by an engine control portion that lags ignition timing or reduces fuel injection amount for reducing the output torque of the engine.

* * * * *